Figure 1A:
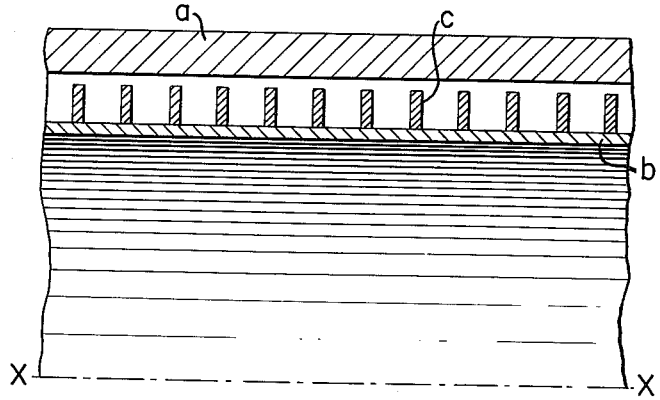

May 14, 1963 A. HUET 3,089,520
METALLIC PIPING SYSTEM FOR FLUIDS AT HIGH TEMPERATURE
Filed April 1, 1960 3 Sheets-Sheet 1

INVENTOR.
ANDRE HUET
BY
ATTORNEY

May 14, 1963 A. HUET 3,089,520
METALLIC PIPING SYSTEM FOR FLUIDS AT HIGH TEMPERATURE
Filed April 1, 1960 3 Sheets-Sheet 3

INVENTOR.
ANDRE HUET
BY
*Robert E Burns*
ATTORNEY

United States Patent Office 3,089,520
Patented May 14, 1963

3,089,520
METALLIC PIPING SYSTEM FOR FLUIDS
AT HIGH TEMPERATURE
Andre Huet, 48 Ave. du President Wilson,
Paris 16°, France
Filed Apr. 1, 1960, Ser. No. 19,375
Claims priority, application France Apr. 7, 1959
4 Claims. (Cl. 138—138)

In certain thermal installations, in particular those which effect the recovery of heat from a fluid which passes out of a nuclear reactor, it is necessary to employ pipes through which this fluid circulates under pressure and at high temperatures, for example of the order of 600° C. and above. In this case the piping can also be of ferritic steel but even if it is of austenitic steel, the effect of the temperature in both cases is that the limit of elasticity of the metal is considerably reduced. The piping must consequently be thicker in order to take into account this reduction of elasticity, but in this case, internal stresses which are liable to become considerable are created in the thickness of the metal as a function of the temperature gradient and there is thus a danger of rupture of the walls.

The present invention has for its object various forms of construction of a pipe intended to guide a fluid at high temperature, for example, of the order of 600° C., thereby providing a remedy for the above-mentioned disadvantages.

In these forms of construction, the main tube which forms the piping system is heat-insulated either on the internal wall or in the thickness of the wall.

In the case in which the main tube is heat-insulated internally, this heat-insulation is carried out, in accordance with the present invention, by disposing in the interior of said tube, a tube of austenitic steel having, for example, a smaller thickness and smooth walls, and separated from the main tube by disks, ribs or partitions, which may be arranged in the form of a helix, or possibly also by corrugated tube-sections. The effect of these partitioning members is to prevent a constant circulation of the fluid in the space which separates the main tube from the internal tube and to create therein a zone of lower temperature. The internal tube, which is subjected to the same pressure of fluid on its two faces, can be of small thickness. The contact by conductivity between the partitioning members and the internal wall of the main tube is also limited as far as possible. In this manner, the main tube is subjected on its internal face to a lower temperature and there is less danger of internal stresses. The partitioning systems have either a certain play or elasticity, in order to take into account the differences of expansion between the two tubes and to this end, they are welded in such manner as to remain elastic and to permit these movements of expansion in all directions.

In the form of embodiment in which the heat-insulation is effected in the wall or even externally with respect to the main tube, there are formed on this tube, in accordance with the present invention either discs which strengthen the external wall of the tube or alternatively, fins or projections of any kind; these discs or projections are mounted in the interior of a tube or of sleeves which surround the main tube in such manner that, when the working temperature is reached, the projections come into contact with the internal wall of the external tube or of the external sleeves, thereby applying a binding action on the main tube. Heat-insulating material is preferably disposed between the projections and the external tube or the binding sleeves; and since on the one hand, said binding sleeves are in contact with the external air on one of their faces and, on the other hand, they are in limited contact with the projections from the point of view of conductivity, their temperature is distinctly lower than that of the main tube and consequently, they can apply a more powerful binding action.

The description which follows below with reference to the accompanying drawings, which are given by way of example without any limitations being implied, will make it quite clear how the present invention can be carried into effect.

FIGS. 1 to 3 illustratie in longitudinal half-section various forms of embodiment of the invention, FIGS. 1 and 2 relating to piping systems having internal heat-insulation, while FIG. 3 relates to piping systems having external heat-insulation.

Figure 1B:
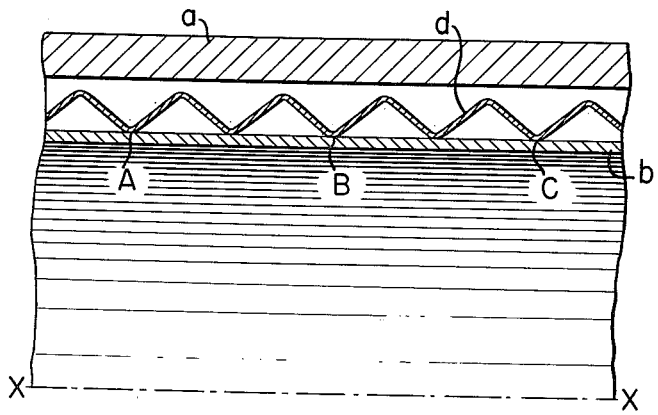
Figure 1C:
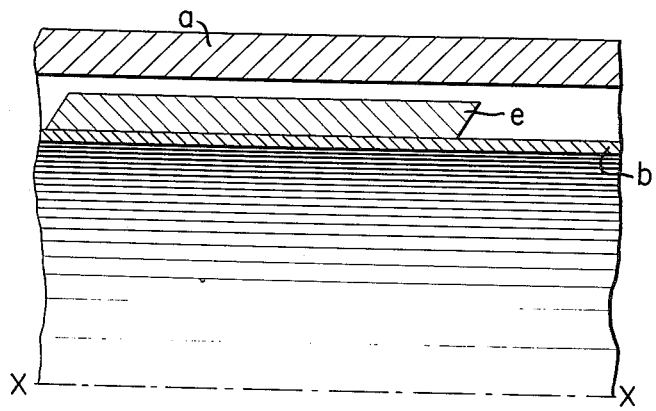

In FIGS. 1a, 1b and 1c there are shown in longitudinal half-section a main pipe a, having its axis along X—X, on which are provided three forms of embodiment of internal heat-insulation. In FIG. 1a there is shown, in the interior of the main pipe a, an internal, smooth-walled tube b of small thickness and on which is mounted a series of discs, for example, or transverse fins c, which terminate as can be seen in the figure, at a certain distance from the internal wall of the tube a. When the piping system is in operation, the fluid which flows in the interior of the pipe is unable to circulate between the tubes a and b on account of the partitions c which, as a result of the temperature of operation, come by expansion into contact with the internal wall of the tube a. In this manner, the fluid which lies stagnant between the tubes b and a is at a lower temperature than in the remainder of the piping and the internal wall of the tube a is thereby protected.

The partitioning device between the two tubes a and b can be formed as shown in FIG. 1b, by a corrugated tube d which is preferably welded only at certain points, for example at its extremities or at various other points spaced apart from each other, such as A B C, on the tube b. When the piping has reached its working temperature, the corrugated system b which has a certain elasticity is compressed between the tubes b and a, in such manner that the fluid-tightness between the two tubes becomes more effective as the operating temperature rises.

In FIG. 1c, the partitioning device between the tubes b and a is constituted by helicoidal ribs e formed on the tube b, or alternatively by means of strips wound helically round the tube.

Figure 2A:
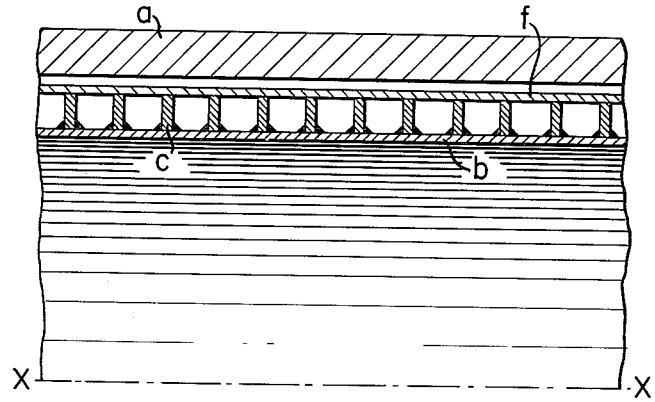

In the alternative form illustrated in FIG. 2a, a tube f placed at a certain distance away from the internal wall of the pipe a has been provided between the internal tube b and the pipe a. The partitioning device, which is constituted by discs or transverse fins c, shuts off the space between the two tubes b and f.

Figure 2B:
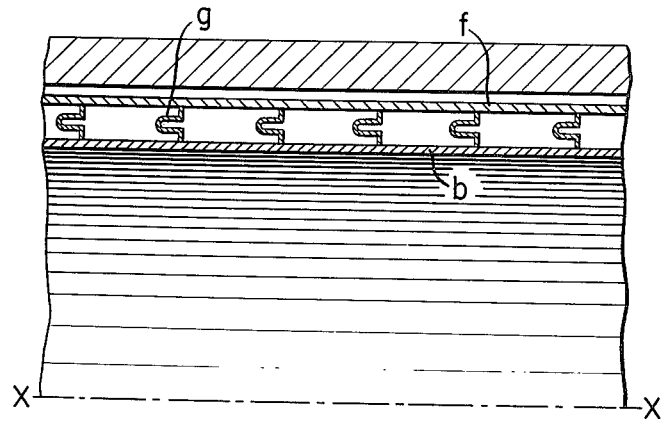

Instead of using discs such as c, it is possible to employ curved discs as shown in FIG. 2b, said curved discs being consequently elastic and capable of being more or less compressed as can be seen in cross-section on the figure, under the effect of the differences of expansion which compress them more or less between the tubes b and f.

Figure 2C:
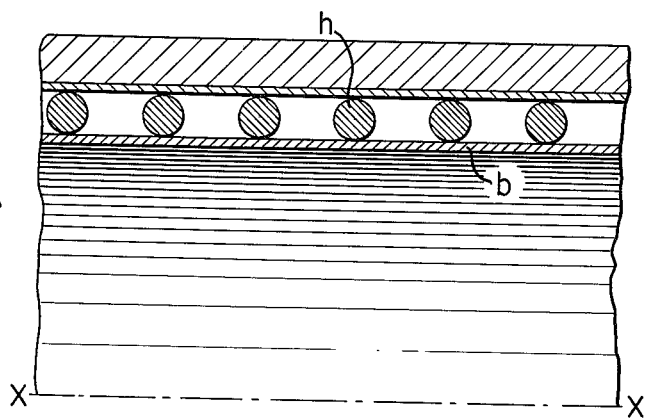

The system of partitions between these two tubes b and f can also be constituted as illustrated in FIG. 2c, simply by a single metallic wire h wound helically round the tube b.

All the devices illustrated in FIG. 2 have this advantage as compared with the devices of FIG. 1, in that, even under working conditions, there is little or no contact by conductivity between the heat-insulating device b, f and the internal wall of the tube a, which is thus brought to a lower temperature.

In accordance with the present invention, the internal heat-insulation which has just been described can be replaced or completed by an external heat-insulation as illustrated in FIG. 3.

Figure 3A:
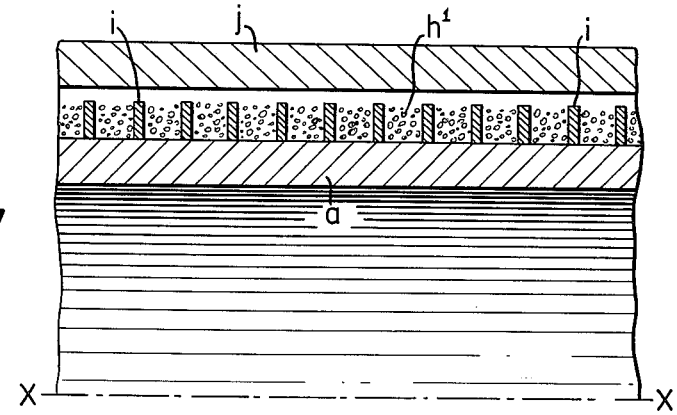

In FIG. 3a, the main tube a having an axis X—X carries discs such as i which apply a reinforcing effect on the wall of the tube a. This reinforcing action is completed by an external tube j which is held at a certain distance away from the discs i, these latter being applied against said external tube when the operating temperature has been reached, with the result that the action of the tube j is that of a binding tube. Heat-insulation material h can be disposed between the discs i so as to reduce still further the temperature reached by the external tube j, thereby reinforcing its binding action.

Figure 3B:
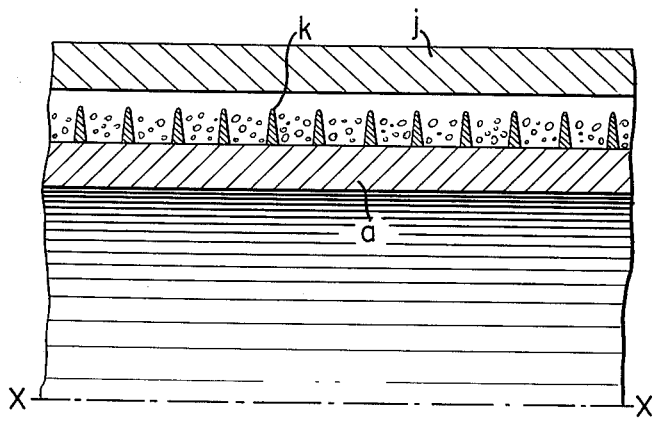

The discs i can be replaced by simple projections such as k, formed on the periphery of the main tube a, as illustrated in FIG. 3b. In this case also, when the operating temperature is reached, the projections k are brought to bear on the binding tube j and thus produce a binding action which is combined with the external heat-insulating action in accordance with the invention.

Figure 3C:
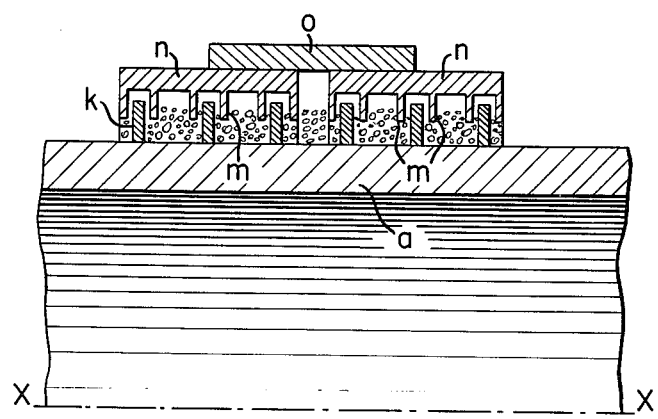

In the alternative form shown in FIG. 3c, discs or projecting portions k formed on the main tube a are fitted into rings such as m, the edges of which are turned down on each side of the projections and apply a binding action as in the previous form. Three rings such as m can be held by a sleeve n, and an additional binding sleeve o can be provided in the spaces between the sleeves n.

These forms of construction have the advantage of providing a means for easy assembly and dismantling. It should be noted that the rings or sleeves can be in two parts which, at the time of assembly, are placed on each side of the tube a to be reinforced.

In all the forms of construction shown in FIG. 3, the tube a, which is heat-insulated at its exterior, is kept on its two faces at closely related temperatures, so that the temperature gradient in the thickness of the tube is held within closer limits. On the other hand, the binding action increases the strength of the tube.

Heat-insulation material can be disposed between the projections k in the case of all the forms of construction shown in FIG. 3. In the case of the internal heat-insulation of FIGS. 1 and 2, this material could also be disposed between the two tubes b and f, or b and a, should the nature and use to which it is desired to put the fluid circulating in the piping system so permit.

What I claim is:

1. A tubular steel conduit for fluids at temperatures in the vicinity of 600° C. and over, comprising a main tube of high mechanical strength provided externally with extensions in the form of radial fins which extend transversely of the axis of said tube, and a secondary tube concentric with the main tube and disposed exteriorly of said main tube and having an inner surface spaced apart radially from the extremities of the extensions by a distance corresponding to the expansion of the main tube and of said extensions at the working temperature.

2. A tubular steel conduit for fluids at temperatures in the vicinity of 600° C. and over, comprising a main tube of high mechanical strength provided externally with extensions in the form of radial fins which extend transversely of the axis of said tube, and a secondary tube concentric with the main tube and disposed exteriorly of said main tube and spaced apart from the extremities of the extensions by a distance corresponding to the expansion of the main tube and of said extensions at the working temperature, the space comprised between the main tube and the secondary tube being packed with heat-insulating material.

3. A tubular steel conduit for fluids at temperatures in the vicinity of 600° C. and over, comprising a main tube of high mechanical strength, provided externally with extensions defined by projections forming part of the body of the tube and extending radially and transversely of the axis of said tube, a secondary tube concentric with the main tube and disposed exteriorly of said main tube and spaced radially apart from the extremities of said projections by a distance corresponding to the expansion of the main tube and of said projections at the working temperature.

4. A tubular steel conduit for fluids at temperatures in the vicinity of 600° C. and over, comprising a main tube of high mechanical strength, provided externally with transverse extensions in the form of radial fins, a secondary tube defined by successive rings concentric with the main tube and disposed on the exterior of said main tube and spaced apart radially from the extensions by a distance corresponding to the expansion of the main tube and of said extensions at the working temperature, the external rings being joined together in pairs by coupling rings.

References Cited in the file of this patent

UNITED STATES PATENTS

| | | |
|---|---|---|
| 2,023,025 | McKee | Dec. 3, 1935 |
| 2,369,204 | Baker | Feb. 13, 1945 |
| 2,599,210 | Thompson | June 3, 1952 |
| 2,658,527 | Kaiser | Nov. 10, 1953 |
| 2,761,949 | Colton | Sept. 4, 1956 |
| 2,896,669 | Broadway et al. | July 28, 1959 |